Jan. 9, 1940.   L. BERTELE   2,186,622
LENS SYSTEM
Filed April 26, 1939
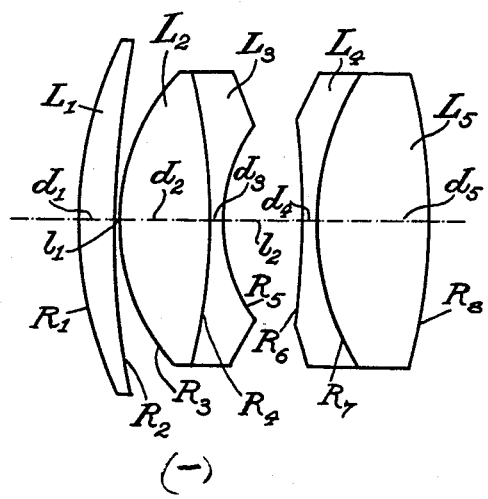
INVENTOR.
Ludwig Bertele
BY B. Singer & F. Stern
ATTORNEYS

UNITED STATES PATENT OFFICE 2,186,622

LENS SYSTEM

Ludwig Bertele, Dresden, Germany, assignor to Zeiss Ikon Aktiengesellschaft, Dresden, Germany Application April 26, 1939, Serial No. 270,059
In Germany May 27, 1938

3 Claims. (Cl. 88—57)

The invention relates to improvements in lens systems for photography and the like, and particularly is directed to a lens system comprising two collective lens units between which is positioned a compound meniscus unit curved toward the front lens unit, all of said units being axially aligned and separated from each other by air spaces. The compound meniscus unit comprises a collective element and a dispersive element cemented together.

It is an object of the invention to provide a lens system of the above mentioned type with a compound meniscus unit whose axial thickness measured along the optical axis is not greater than 25% of the focal length of the lens system as a whole.

Another object of the invention is to employ in the compound meniscus unit a dispersive element whose more strongly curved concave surface has for the $d$-line a refractive index larger than 1.64.

The drawing illustrates diagrammatically the outline of the axial cross section of a lens system in accordance with the present invention.

According to the drawing, the lens system consists of three units in axial alinement and separated by air, the axial separating distances being designated with $l_1$ and $l_2$ respectively. The front unit, which faces the object to be photographed, is a single collective lens $L_1$ ($d_1$). The center unit is a compound meniscus composed of a collective lens $L_2$ ($d_2$) and a dispersive lens $L_3$ ($d_3$) both of which are cemented together. The more strongly curved convex face $R_3$ of the collective lens $L_2$ ($d_2$) faces the front lens $L_1$ ($d_1$), while the more strongly curved concave face $R_5$ faces the third or rear lens unit. The axial thickness of the meniscus unit along the optical axis is not greater than 25% of the focal length of the lens system. The rear lens unit is collective and is composed of a negative lens $L_4$ ($d_4$) and a collective lens $L_5$ ($d_5$) cemented together. The negative lens $L_4$ ($d_4$) faces the dispersive lens $L_3$ ($d_3$) of the meniscus unit. The cemented face $R_7$ of the rear collective unit $L_4$ ($d_4$), $L_5$ ($d_5$) is curved toward the front or toward the meniscus unit.

Lens systems of this type are well suited for larger relative apertures, for instance 1:2.8 and for picture angles of ±30°. It is, however, always difficult to eliminate the comatic errors for medial inclinations in such cases where the comatic errors for rays of small inclination and largest inclination are eliminated.

In accordance with the present invention this disadvantage is overcome by selecting a great refractive index for the material of the lens $L_3$ ($d_3$) so that the more strongly curved concave face $R_5$ of the dispersive lens of the meniscus does not have to be so strongly curved as heretofore. Good results are obtained with a refractive index of 1.64 or greater.

In the following the optical data are given, by way of example, for a lens system having a focal length of f=100 mm. and an aperture of 1:2.8.

| | | | $n_d$ | $v$ |
|---|---|---|---|---|
| $L_1$ | $R_1=+\ 52.40$ | $d_1=\ 4.25$ | 1.6203 | 60.3 |
| | $R_2=+115.16$ | $l_1=\ 0.21$ | | |
| $L_2$ | $R_3=+\ 27.57$ | $d_2=11.25$ | 1.6883 | 31.2 |
| $L_3$ | $R_4=-\ 97.07$ | $d_3=\ 1.59$ | 1.7620 | 26.5 |
| | $R_5=+\ 21.23$ | $l_2=\ 9.76$ | | |
| $L_4$ | $R_6=-127.46$ | $d_4=\ 2.12$ | 1.5112 | 50.8 |
| | $R_7=+\ 35.04$ | | | |
| $L_5$ | $R_8=-\ 73.21$ | $d_5=14.33$ | 1.6664 | 48.6 |

What I claim is:

1. A lens system comprising a collective front unit, a meniscus shaped center unit and a collective rear unit, all of said units being axially aligned and air separated from each other, the front unit consisting of a single convexo-concave lens whose concave face is directed toward said center unit, said meniscus shaped center unit being composed of a collective element and a dispersive element cemented together, said collective element being bi-convex whose face having the smaller radius of curvature is curved toward said front unit, said dispersive element having its more strongly curved concave face directed toward said collective rear unit, the refractive index for the $d$-line of the more strongly curved face of said dispersive element being larger than 1.64 and the axial thickness of said meniscus-shaped center unit measured along the optical axis being smaller than 25% of the focal length of the lens system as a whole, and said collective rear unit being a compound lens having a cemented face curved toward said center unit.

2. A lens system comprising a collective front unit, a meniscus shaped center unit and a collective rear unit, all of said units being axially aligned and air separated from each other, the front unit consisting of a single convexo-concave lens whose concave face is directed toward said center unit, said meniscus shaped center unit being composed of a collective element and a dispersive element cemented together, said collective element being bi-convex whose face having the smaller radius of curvature is curved toward said front unit, said dispersive element having its more strongly curved concave face directed toward said collective rear unit, the refractive index for the $d$-line of the more strongly curved face of said dispersive element being larger than 1.64 and the axial thickness of said meniscus-shaped center unit measured along the optical axis being smaller than 25% of the focal length of the lens system as a whole, and said collective rear unit being a compound lens composed of a bi-concave lens and a bi-convex lens cemented together with the bi-concave lens facing the center unit.

3. A lens system comprising a collective front unit, a meniscus shaped center unit and a collective rear unit, all of said units being axially aligned and air separated from each other, the front unit consisting of a single collective lens, said meniscus shaped center unit being composed of a collective element and a dispersive element cemented together, said collective element being bi-convex whose face having the smaller radius of curvature is curved toward said front unit, said dispersive element having its more strongly curved concave face directed toward said collective rear unit, the refractive index for the $d$-line of the more strongly curved face of said dispersive element being larger than 1.64 and the axial thickness of said meniscus-shaped center unit measured along the optical axis being smaller than 25% of the focal length of the lens system as a whole, and said collective rear unit being a compound lens having a cemented face curved toward said center unit.

LUDWIG BERTELE.